UNITED STATES PATENT OFFICE.

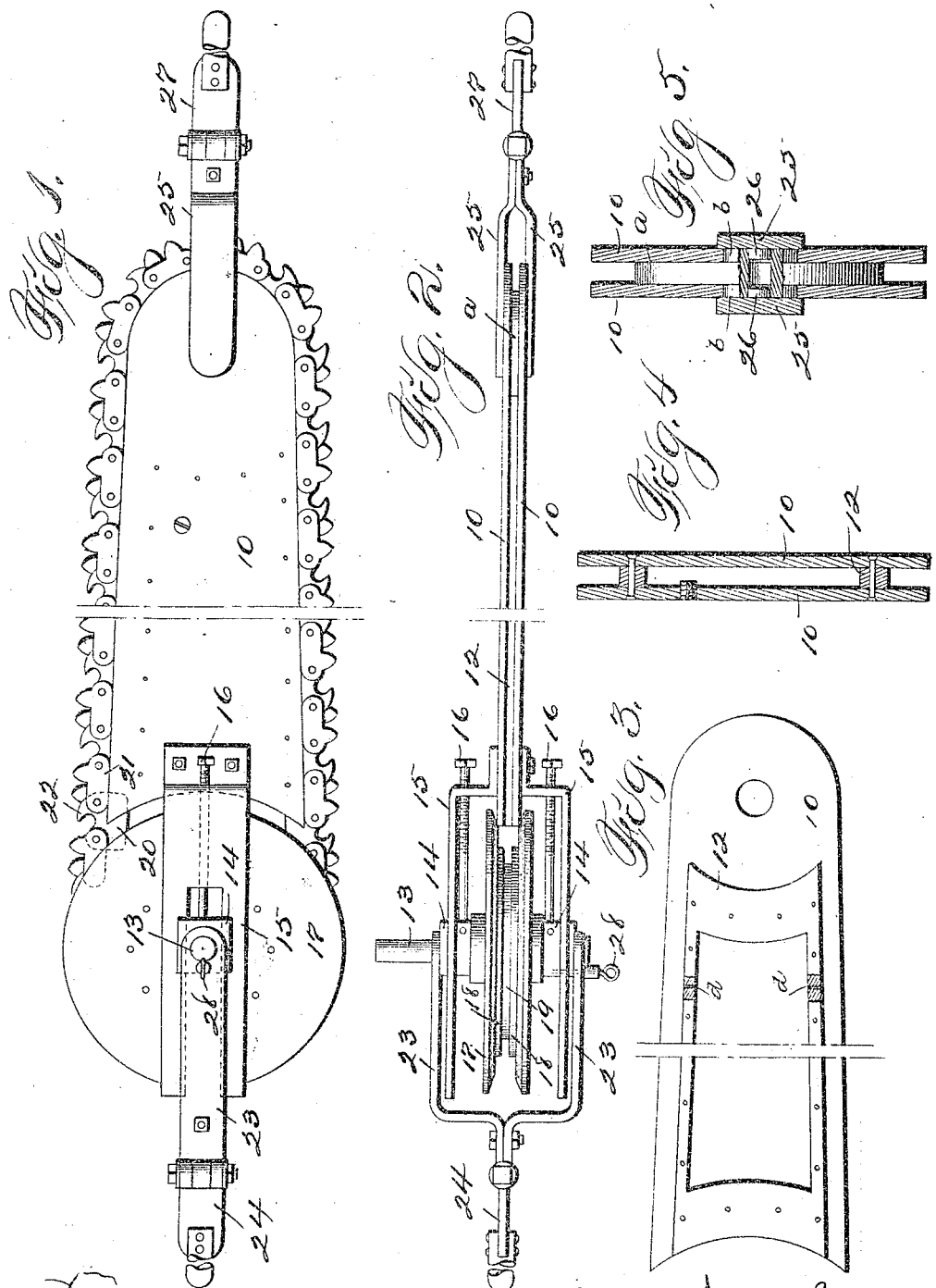

JACOB SMITH, OF DES MOINES, IOWA.

ENDLESS CHAIN SAW.

No. 830,860.                Specification of Letters Patent.        Patented Sept. 11, 1906.

Application filed December 27, 1904. Serial No. 238,541.

*To all whom it may concern:*

Be it known that I, JACOB SMITH, a citizen of the United States, residing at Des Moines, in the county of Polk and State of Iowa, have invented a new and useful Endless Chain Saw, of which the following is a specification.

My object is to provide a portable endless chain saw specially adapted to be manually held and manipulated for cutting down trees and also adapted for cutting fallen trees into different lengths for different purposes.

My invention consists in the construction of elements and subcombinations and the arrangement and combination of all the parts, as hereinafter set forth, pointed out in my claims, and illustrated in the accompanying drawings, in which—

Figure 1 is a side view of the endless saw and the frame upon which it is supported and operated. It shows a driving-wheel on a rotatable shaft in engagement with the saw, as required in practical use. Fig. 2 is an edge or top view of the machine-frame shown in Fig. 1 and shows means for regulating the tension of the endless saw. Fig. 3 is a side view of one of the main portions of the frame that supports the endless saw and shows a smaller frame riveted to its inside face, as required to produce a track upon which the endless saw moves. Fig. 4 is an enlarged transverse sectional view of the two plates of the main frame and the frame between them that produces the track upon which the endless saw travels and also shows an oil-chamber for lubricating the tracks and saw and a removable plug that closes the aperture through which oil is filled into the chamber. Fig. 5 is an enlarged transverse sectional view through Fig. 1 and shows the ends of a jointed handle pivotally connected with the parallel outsides of the small end of the main frame, as required to adjust the handle.

The numerals 10 designate the mating parts of the main frame, and 12 the skeleton frame having straight sides and inwardly-curved ends fixed between them to produce a track for the endless saw.

A rotatable shaft 13 is mounted in adjustable bearings 14, supported in brackets 15, fixed to the outside faces of the mating parts 10 of the main frame, as shown in Fig. 2. Set-screws 16 are seated in the bends of the brackets and connected with the bearings 14 for adjusting the shaft 13 relative to the frame and saw, as required for regulating the tension of the saw on the track of the frame.

A drive-wheel 17 is fixed on the shaft 13 and is composed of two mating metal disks 18 and a disk 19 of smaller diameter, preferably made of wood or other suitable material, adapted to increase friction of the saw-links that come in contact therewith when the links are engaged by the wheel, as required to move the saw in the grooved drive-wheel thus formed. A wheel $a$, having trunnions $b$, is mounted between the small ends of the frame members 10 to support the saw.

A frame composed of two mating elbow-shaped parts 23 is pivotally connected with the shaft 13, as shown in Fig. 2. An extension 24 is hinged to the ends of the parts 23 to serve as a handhold for adjusting the frame and operating the endless saw.

A frame composed of two mating parts 25, provided with journals 26 on their inside faces, is pivotally connected with the narrow ends of the mating plates 10, as shown in Fig. 5, and an extension 27 is hinged thereto to serve as a handhold for a person to aid in operating the saw.

By means of the skeleton frame 12 and the sides 10, fixed thereto, an oil-reservoir is produced for lubricating the blocks in the chain and the track upon which they are moved. A plug $c$ is fitted in an aperture in one of the sides 10, as shown in Fig. 4, to admit oil. Vent $t$ are provided, as shown in Fig. 1 or in any suitable way, for lubricating the track.

It is obvious a crank-handle may be connected with the rotatable shaft as required for manually operating the saw or a suitable motor applied in any suitable way as required for the practical operation of the invention.

To retain the frame that is pivoted to the shaft 13 stationary, a pin 28 is connected with one of the parts of the frame to enter a perforation in one of the bearings 14, as shown in Fig. 2 or in any suitable way.

By connecting a handle with each end of the machine persons at its ends can handle the machine advantageously, as required when in practical operation and also in moving it about.

Having thus set forth the purpose of my invention and the manner of its construction and use, the practical operation and utility thereof will be readily understood by lumbermen and others familiar with the art to which it pertains.

What I claim as new, and desire to secure by Letters Patent, is—

1. A frame for supporting an endless chain saw composed of two flat mating solid sides and a track consisting of a skeleton frame having straight edges and inwardly-curved ends fixed between them to produce a chamber for storing oil for lubricating the track, an opening in the frame for filling oil into the chamber and means to close the opening, vents in the skeleton frame for discharging oil, a drive-wheel in the large end of the frame, a pulley-wheel at the small end of the frame and an endless saw, arranged and combined to operate as set forth.

2. A frame for supporting an endless chain saw, composed of two mating sides and a skeleton track fixed between them, two elbow-shaped brackets fixed to the large end of the frame, two adjustable bearings, a rotatable shaft in said bearings and a drive-wheel fixed to the shaft between the two mating sides of the frame and a wheel mounted in the other end of the frame and an endless saw, arranged and combined to operate as set forth, for the purposes stated.

3. A frame for supporting an endless chain saw composed of two mating sides and a skeleton track fixed between them, two elbow-shaped brackets fixed to the large end of the frame, two adjustable bearings, a rotatable shaft in said bearings and a drive-wheel fixed to the shaft between the two mating sides of the frame, an adjustable frame, to serve as a handle in which the shaft rotates and a wheel to support the saw in the other end of the frame and track, arranged and combined to operate as set forth, for the purposes stated.

4. A frame for supporting an endless chain saw composed of two mating sides and a track fixed between them, two elbow-shaped brackets fixed to the large end of the frame, two adjustable bearings, a rotatable shaft in said bearings and a drive-wheel fixed to the shaft between the two mating sides of the frame, a wheel to support and guide the saw at the other end of the frame, a frame composed of two mating parts pivotally connected with the rotatable shaft, handholds connected with the outer ends of said mating parts of said frame, means for retaining said mating parts of the pivoted frame stationary and a frame having a handhold at its outer end pivotally connected with the small end of the main frame.

5. In a machine for operating an endless saw, a drive-wheel composed of two mating metal disks and a disk of smaller diameter fixed between the two mating metal disks, in combination with a frame having grooved tracks in its straight edges and two mating fixed brackets at one end of the frame and a rotatable shaft in said brackets, a guide-wheel at the other end of the frame and an endless saw on the wheels, to operate in the manner set forth.

6. A machine for operating an endless saw comprising a frame for supporting an endless chain saw and a track fixed between the mating sides of the frame, two elbow-shaped brackets fixed to the large end of the frame, two adjustable bearings, a rotatable shaft in said bearings and a drive-wheel fixed to the shaft between the two mating sides of the frame, a handle composed of two mating parts having shaft-bearings in their ends in which the shaft rotates, a handhold hinged to the end of the handle and means for retaining the handle stationary, a wheel to support and guide a saw at the other end of the track and frame and an endless saw mounted on the track in the frame and on the drive-wheel, arranged and combined to operate in the manner set forth, for the purposes stated.

7. In an endless-chain-saw machine, a frame having a smooth track, a drive-wheel on an adjustable shaft in one end of the frame, a wheel to support and guide a saw at its other end, an endless chain saw on said track and wheels, means to adjust said shaft and a handle composed of two mating elbow-shaped parts in which the adjustable shaft rotates and an extension hinged to their journaled ends, to operate in the manner set forth.

8. An endless-chain-saw machine comprising a frame composed of two mating sides and a skeleton track fixed between them to produce an oil-reservoir, a drive-wheel having a groove in its circumferential edge in one end of the frame, a smaller wheel to support and guide a saw in its other end, an endless chain saw, means to regulate the tension of the saw comprising an adjustable shaft and said drive-wheel on the shaft, an adjustable handle at the large end of the frame composed of two mating elbow-shaped parts in which the shaft rotates and an adjustable handle at the other end of the frame, arranged and combined to operate as set forth.

9. In an endless-chain-saw machine, a frame for supporting an endless saw, frames pivotally connected with the ends of the frame to serve as handles and handholds hinged to said pivoted frames to operate as set forth.

JACOB SMITH.

Witnesses:
R. C. ORWIG,
THOMAS G. ORWIG.